(12) United States Patent
Teruuchi (10) Patent No.: US 11,508,106 B2
(45) Date of Patent: Nov. 22, 2022

(54) DISPLAY CONTROL DEVICE, COMMUNICATION DEVICE, DISPLAY CONTROL METHOD, AND RECORDING MEDIUM

(71) Applicant: JVCKENWOOD Corporation, Yokohama (JP)

(72) Inventor: Takuji Teruuchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 266 days.

(21) Appl. No.: 16/842,811

(22) Filed: Apr. 8, 2020

(65) Prior Publication Data

US 2020/0234479 A1 Jul. 23, 2020

Related U.S. Application Data

(63) Continuation of application No. PCT/JP2018/039528, filed on Oct. 24, 2018.

(30) Foreign Application Priority Data

Jan. 17, 2018 (JP) .............................. JP2018-005700

(51) Int. Cl.
*G06T 13/20* (2011.01)
*G10L 15/22* (2006.01)
(Continued)

(52) U.S. Cl.
CPC .......... *G06T 13/205* (2013.01); *G06V 40/165* (2022.01); *G06V 40/171* (2022.01); *G10L 15/22* (2013.01); *G10L 15/25* (2013.01)

(58) Field of Classification Search
CPC ......... G06T 13/205; G06T 7/20; G06T 13/80; G10L 15/22; G10L 15/25; G10L 15/00;
(Continued)

(56) References Cited

U.S. PATENT DOCUMENTS

| 5,907,351 A | 5/1999 | Chen et al. |
| 6,014,625 A | 1/2000 | Lee |

(Continued)

FOREIGN PATENT DOCUMENTS

| JP | 09265253 | 10/1997 |
| JP | 2003-296753 | 10/2003 |

(Continued)

OTHER PUBLICATIONS

International Search Report and Written Opinion for International Patent Application No. PCT/JP2018/039528 dated Jan. 8, 2019, 11 pages.

(Continued)

*Primary Examiner* — David T Welch
(74) *Attorney, Agent, or Firm* — Amin, Turocy & Watson, LLP (57) ABSTRACT

An disclosure includes: moving image acquisition unit configured to acquire moving image data obtained through moving image capturing of at least a mouth part of an utterer; a lip detection unit configured to detect a lip part from the moving image data and detect motion of the lip part; a moving image processing unit configured to generate a moving image enhanced to increase the motion of the lip part detected by the lip detection unit; and a display control unit configured to control a display panel to display the moving image generated by the moving image processing unit.

10 Claims, 7 Drawing Sheets

(51) Int. Cl.
*G10L 15/25* (2013.01)
*G06V 40/16* (2022.01)

(58) Field of Classification Search
CPC .... G06V 40/165; G06V 40/171; G06V 40/20; G09B 21/009; G06F 3/16; G06F 3/167; H04M 1/00; H04M 1/724; H04N 7/18
See application file for complete search history.

(56) References Cited

U.S. PATENT DOCUMENTS

| | | | | |
|---|---|---|---|---|
| 10,755,463 | B1* | 8/2020 | Albuz | G10L 13/00 |
| 10,770,092 | B1* | 9/2020 | Adams | G10L 21/10 |
| 2011/0131041 | A1* | 6/2011 | Cortez | G10L 15/16 |
| | | | | 704/235 |
| 2013/0141643 | A1* | 6/2013 | Carson | H04N 21/43072 |
| | | | | 348/515 |
| 2014/0379351 | A1* | 12/2014 | Raniwala | G06V 40/20 |
| | | | | 704/270 |
| 2015/0042662 | A1* | 2/2015 | Latorre-Martinez | G06T 13/80 |
| | | | | 345/473 |
| 2017/0287481 | A1* | 10/2017 | Bhat | G10L 15/26 |
| 2019/0279642 | A1* | 9/2019 | Shukla | G10L 15/25 |

FOREIGN PATENT DOCUMENTS

| | | |
|---|---|---|
| JP | 2004-098252 | 4/2004 |
| JP | 2006-005440 | 1/2006 |
| JP | 2008-099121 | 4/2008 |
| JP | 2012-103904 | 5/2012 |
| KR | 2001-0102718 | 11/2001 |
| KR | 2007-0061207 | 6/2007 |
| KR | 2013-0022607 | 3/2013 |
| KR | 2013-0096983 | 9/2013 |

OTHER PUBLICATIONS

Extended European Search Report for European Patent Application No. 18901303.0 dated Jun. 22, 2020.

* cited by examiner

|  | WORD 1 | | WORD 2 | |
|---|---|---|---|---|
| RECOGNITION PROCESSING | RECOGNITION RESULT | RECOGNITION RATE | RECOGNITION RESULT | RECOGNITION RATE |
| VOICE RECOGNITION PROCESSING | OHAYOU | 100% | GOZAIMASU | 100% |
| LIP RECOGNITION PROCESSING | OAYOU | 75% | GOAIMASU | 80% |

DISPLAY CONTROL DEVICE, COMMUNICATION DEVICE, DISPLAY CONTROL METHOD, AND RECORDING MEDIUM

CROSS-REFERENCE TO RELATED APPLICATION(S)

This application is a continuation of PCT international application Ser. No. PCT/JP2018/039528 filed on Oct. 24, 2018 which designates the United States, incorporated herein by reference, and which claims the benefit of priority from Japanese Patent Application No. 2018-005700, filed on Jan. 17, 2018, incorporated herein by reference.

BACKGROUND

1. Technical Field

The present disclosure relates to a display control device, a communication device, a display control method, and a recording medium.

2. Description of the Related Art

A technology for facilitating a call performed by using a communication device has been known. Another technology of displaying the content of utterance by a calling counterpart in text through voice recognition has been known (refer to Japanese Laid-open Patent Publication No. 2008-99121 A, for example). Another technology of generating and displaying a pattern or a figure representing lip motion and outputting text information of a voice recognition result of a transmitted voice signal or voice associated with a synthesis voice signal has been known (refer to Japanese Laid-open Patent Publication No. 2006-005440 A, for example).

When the calling counterpart is a hearing-impaired person, the technology disclosed in Patent Literature 1 or 2 can be used to allow the hearing-impaired person to easily perform a call.

However, when the content of utterance is displayed in text or output in synthesis voice, a nuance intended by the utterer is potentially not conveyed appropriately. In addition, when displayed lip motion is small, the content of utterance potentially cannot be recognized appropriately.

SUMMARY

It is an object of the present disclosure to at least partially solve the problems in the conventional technology.

To solve the above problem and achieve the above object, a display control device according to the present disclosure includes a moving image acquisition unit configured to acquire moving image data obtained through moving image capturing of at least a mouth part of an utterer, a lip detection unit configured to detect a lip part from the moving image data and detect motion of the lip part, a lip motion recognition unit configured to recognize an utterance content from the motion of the lip part detected by the lip detection unit, a voice acquisition unit configured to acquire voice data of uttered voice of the utterer, a voice recognition unit configured to recognize voice from the voice data acquired by the voice acquisition unit, a comparison unit configured to compare a result of the recognition by the voice recognition unit with a result of the recognition by the lip motion recognition unit, a moving image processing unit configured to, when a recognition rate of the result of the recognition by the lip motion recognition unit is lower than a recognition rate of the result of the recognition by the voice recognition unit as a result of the comparison by the comparison unit, generate a moving image enhanced to increase the motion of the lip part detected by the lip detection unit, and a display control unit configured to control a display unit to display the moving image generated by the moving image processing unit.

A communication device according to the present disclosure includes the above display control device, and a call processing unit configured to perform call processing. The voice acquisition unit acquires uttered voice at calling, and the moving image processing unit enhances a moving image transmitted by the call processing unit to increase the motion of the lip part detected by the lip detection unit.

A communication device according to the present disclosure includes the above display control device, and a call processing unit configured to perform call processing. The voice recognition unit recognizes voice from voice data received and acquired by the call processing unit, and the moving image acquisition unit acquires moving image data received by the call processing unit.

A display control method according to the present disclosure includes a moving image acquisition step of acquiring moving image data obtained through moving image capturing of at least a mouth part of an utterer, a lip detection step of detecting a lip part from the moving image data and detecting motion of the lip part, a lip motion recognition step of recognizing an utterance content from the motion of the lip part detected by the lip detection step, a voice acquisition step of acquiring voice data of uttered voice of the utterer, a voice recognition step of recognizing voice from the voice data acquired by the voice acquisition step, a comparison step of comparing a result of the recognition by the voice recognition step with a result of the recognition by the lip motion recognition step, a moving image processing step of, when a recognition rate of the result of the recognition by the lip motion recognition step is lower than a recognition rate of the result of the recognition by the voice recognition step as a result of the comparison by the comparison step, generating a moving image enhanced to increase the motion of the lip part detected by the lip detection step, and a display control step of controlling a display unit to display the moving image generated by the moving image processing step.

A non-transitory computer readable recording medium according to the present disclosure storing therein a computer program configured to cause a computer to execute a moving image acquisition step of acquiring moving image data obtained through moving image capturing of at least a mouth part of an utterer, a lip detection step of detecting a lip part from the moving image data and detecting motion of the lip part, a lip motion recognition step of recognizing an utterance content from the motion of the lip part detected by the lip detection step, a voice acquisition step of acquiring voice data of uttered voice of the utterer, a voice recognition step of recognizing voice from the voice data acquired by the voice acquisition step, a comparison step of comparing a result of the recognition by the voice recognition step with a result of the recognition by the lip motion recognition step, a moving image processing step of, when a recognition rate of the result of the recognition by the lip motion recognition step is lower than a recognition rate of the result of the recognition by the voice recognition step as a result of the comparison by the comparison step, generating a moving image enhanced to increase the motion of the lip part detected by the lip detection step, and a display control step of controlling a display unit to display the moving image generated by the moving image processing step.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Embodiments of a display control device, a communication device, a display control method, and a computer program according to the present disclosure will be described below in detail with the accompanying drawings. The present disclosure is not limited to the embodiments described below.

First Embodiment

Figure 1:
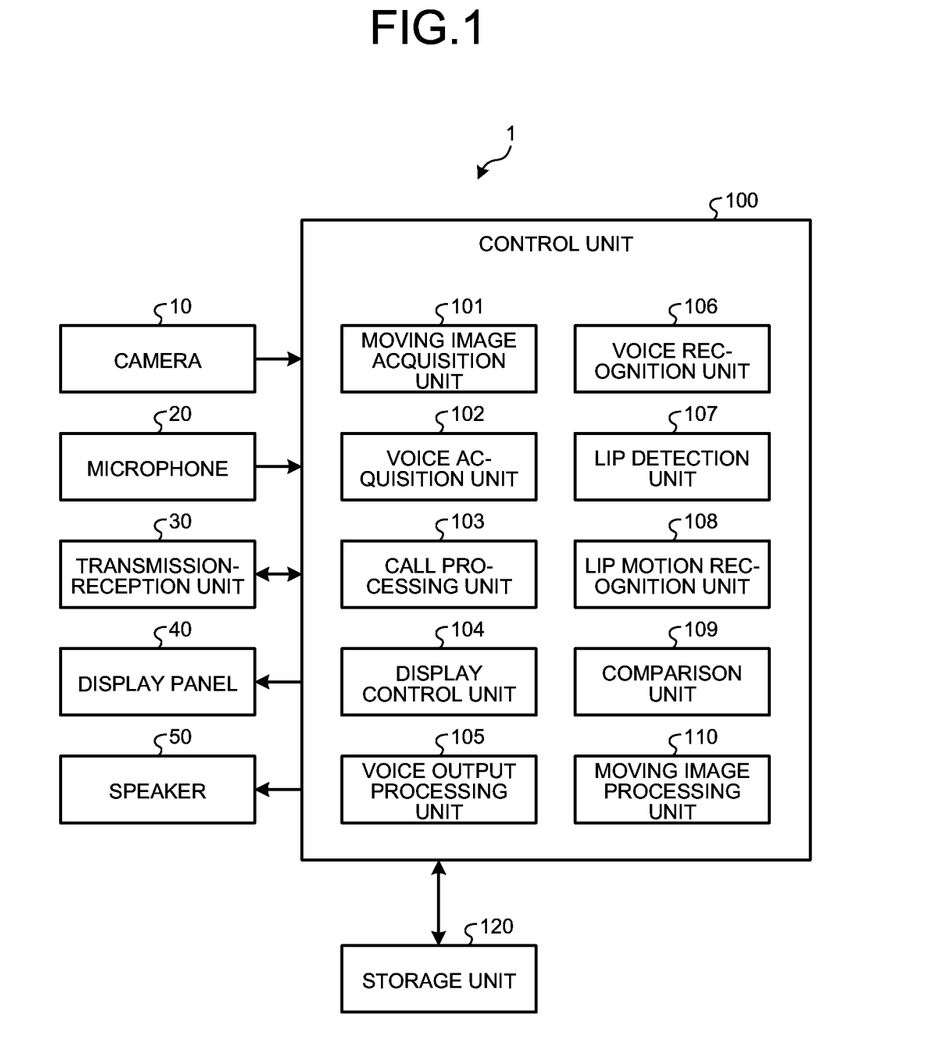
FIG. 1 is a block diagram illustrating an exemplary configuration of a communication device according to a first embodiment.
Figure 2:
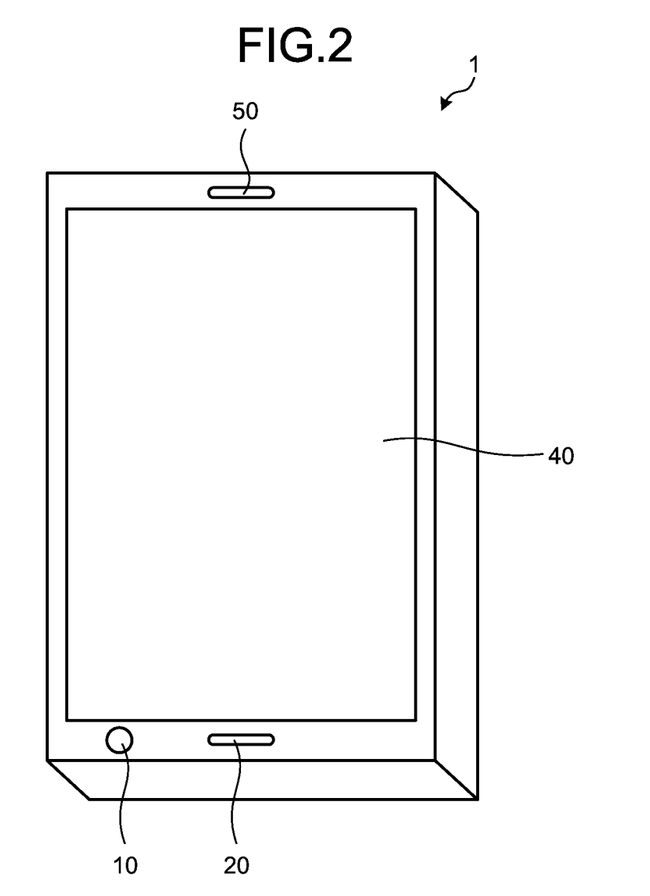
FIG. 2 is a schematic view illustrating an exemplary configuration of the communication device according to the first embodiment.

FIG. 1 is a block diagram illustrating an exemplary configuration of a communication device according to a first embodiment. FIG. 2 is a schematic view illustrating an exemplary configuration of the communication device according to the first embodiment. This communication device 1 is a communication device including a portable electronic device having a call function, such as a cellular phone, or a computer. In the present embodiment, the communication device 1 is a cellular phone. The communication device 1 includes a camera 10, a microphone 20, a transmission-reception unit 30, a display panel (display unit) 40, a speaker 50, and a control unit 100. In the present embodiment, an utterer is a user of the communication device 1. In the present embodiment, a calling counterpart of the user is a hearing-impaired person. In the present embodiment, the communication device 1 transmits voice data of uttered voice of the utterer as the user and moving image data of an enhancement moving image 210 to the calling counterpart as the hearing-impaired person.

The camera 10 captures a moving image including at least a mouth part including a lip part 200 of the user. In the present embodiment, the camera 10 captures a moving image of a face part of the user. The camera 10 is disposed at a position where the camera 10 can capture a moving image of at least the lip part 200 of the user at calling. In the present embodiment, the camera 10 is disposed below a display panel 40 of the communication device 1. The camera 10 always captures a moving image after a call starts at the communication device 1. The camera 10 outputs data of the captured moving image to a moving image acquisition unit 101 of the control unit 100.

The microphone 20 acquires a voice signal of uttered voice of the user. In the present embodiment, the microphone 20 is disposed below the display panel 40 of the communication device 1. The microphone 20 always acquires the voice signal after a call starts at the communication device 1. The microphone 20 outputs the acquired voice signal to a voice acquisition unit 102 of the control unit 100.

The transmission-reception unit 30 enables calling in voice and moving image. The transmission-reception unit 30 transmits voice data of uttered voice of the user and moving image data of the face part of the user to a communication device used by the calling counterpart. The transmission-reception unit 30 receives voice data of uttered voice of the calling counterpart and moving image data of a face part of the calling counterpart. The transmission-reception unit 30 performs communication in a wireless or wired manner. The transmission-reception unit 30 may use a cellular phone line including, for example, a 4G line. The transmission-reception unit 30 may use a wireless communication standard including, for example, Wifi (registered trademark). The transmission-reception unit 30 may use a wired communication standard. In the transmission-reception unit 30, the start and end of a call are controlled by a call processing unit 103 of the control unit 100.

The display panel 40 is a display including a liquid crystal display (LCD) or an organic electro-luminescence (organic EL) display. The display panel 40 displays a moving image based on an image signal output from a display control unit 104 of the control unit 100.

The speaker 50 is a sound output device. The speaker 50 outputs voice based on a voice signal output from a voice output processing unit 105 of the control unit 100. In the present embodiment, the speaker 50 outputs uttered voice of the calling counterpart while calling is performed through the transmission-reception unit 30.

The control unit 100 is an arithmetic processing device including, for example, a central processing unit (CPU). The control unit 100 loads a computer program stored in a storage unit 120 onto a memory, and executes a command included in the computer program. When the recognition rate of the lip part 200 of the user is low, the control unit 100 generates the enhancement moving image 210 in which motion of the lip part 200 of the user is enhanced. The control unit 100 includes the moving image acquisition unit 101, the voice acquisition unit 102, the call processing unit 103, the display control unit 104, the voice output processing unit 105, a voice recognition unit 106, a lip detection unit 107, a lip motion recognition unit 108, a comparison unit 109, and a moving image processing unit 110. The control unit 100 includes an internal memory (not illustrated), and the internal memory is used for, for example, data temporary storage at the control unit 100.

The moving image acquisition unit 101 acquires moving image data obtained by capturing a moving image of at least the mouth part including the lip part 200 of the utterer. In the present embodiment, the moving image acquisition unit 101 acquires the moving image data obtained by the camera 10 through the moving image capturing of at least the mouth part including the lip part 200 of the user. More specifically, the moving image acquisition unit 101 acquires the moving image data as digital data by executing encoding processing and the like on an image signal output from the camera 10. The moving image acquisition unit 101 outputs the acquired moving image data to the lip detection unit 107 and the moving image processing unit 110.

The voice acquisition unit 102 acquires voice data of uttered voice of the utterer. More specifically, the voice acquisition unit 102 acquires the voice data as digital data by executing analog/digital (A/D) conversion processing on a voice signal output from the microphone 20. The voice acquisition unit 102 outputs the acquired voice data to the call processing unit 103, the voice recognition unit 106, and the comparison unit 109.

The call processing unit 103 performs call processing through the transmission-reception unit 30. The call processing unit 103 outputs the voice data of the user and the moving image data of the user to the transmission-reception unit 30. The call processing unit 103 acquires voice data of the calling counterpart and moving image data of the calling counterpart from the transmission-reception unit 30. The call processing unit 103 outputs the acquired moving image data of the user or the calling counterpart to the display control unit 104. The call processing unit 103 outputs the acquired voice data of the calling counterpart to the voice output processing unit 105.

The display control unit 104 outputs, to the display panel 40, an image signal for displaying the enhancement moving image 210 of the user or the calling counterpart at calling. More specifically, the display control unit 104 executes decoding processing on moving image data acquired from the call processing unit 103 and outputs an image signal to the display panel 40. Alternatively, the display control unit 104 executes decoding processing on moving image data acquired by the moving image acquisition unit 101 and outputs an image signal to the display panel 40.

The voice output processing unit 105 executes decoding processing and digital/analog (D/A) conversion processing on voice data acquired by the call processing unit 103, and outputs a voice signal to the speaker 50.

The voice recognition unit 106 executes voice recognition processing of recognizing voice from voice data acquired by the voice acquisition unit 102. The voice recognition processing may be performed in an arbitrary unit such as each phoneme or each word. The voice recognition processing may be performed by any well-known method and is not limited. The voice recognition unit 106 outputs a result of the recognition to the comparison unit 109.

The lip detection unit 107 detects the lip part 200 from moving image data acquired by the moving image acquisition unit 101, and detects motion of the lip part 200. More specifically, the lip detection unit 107 and performs face recognition processing on the moving image data and detects the lip part 200. Alternatively, the lip detection unit 107 recognizes the lip part 200 by, for example, performing image recognition processing while referring to lip dictionary data. The lip detection unit 107 detects motion of the lip part 200 thus detected. The lip detection unit 107 outputs a result of the detection to the lip motion recognition unit 108.

The lip motion recognition unit 108 recognizes an utterance content from the motion of the lip part 200 detected by the lip detection unit 107. More specifically, the lip motion recognition unit 108 recognizes an utterance content by performing image recognition processing while referring to the lip dictionary data. The lip motion recognition processing may be performed in an arbitrary unit such as each phoneme or each word. The lip motion recognition unit 108 outputs a result of the recognition to the comparison unit 109.

Figure 3:
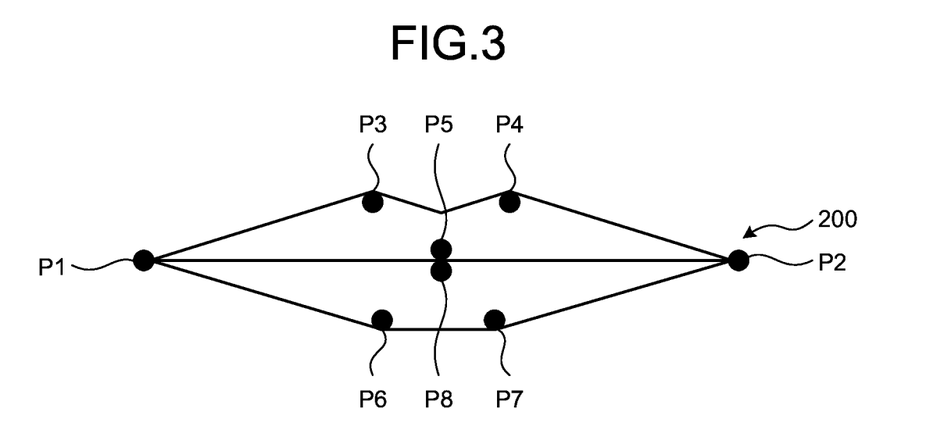
FIG. 3 is a diagram for explaining a lip part, illustrating a state in which lips are closed.
Figure 4:
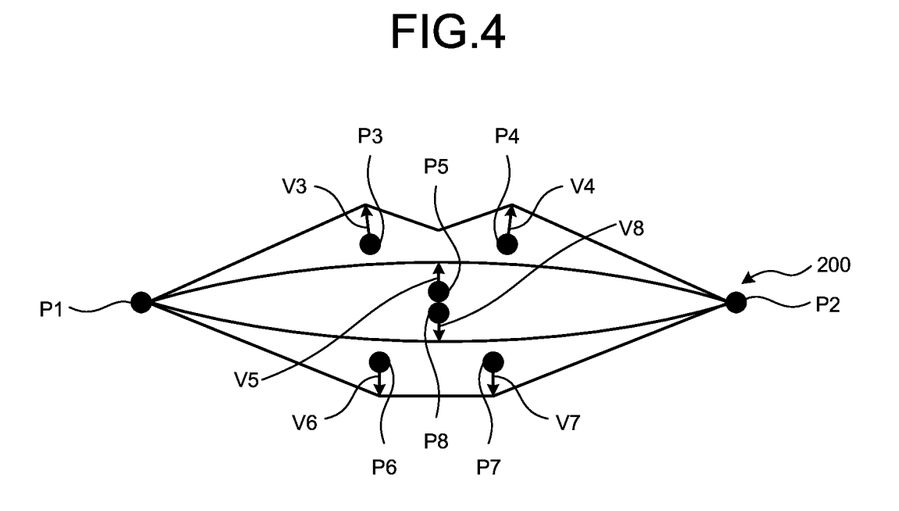
FIG. 4 is a diagram for description of exemplary motion of the lip part.

The following describes the lip motion recognition processing with reference to FIGS. 3 and 4. FIG. 3 is a diagram for explaining the lip part, illustrating a state in which the lips are closed. The position of each site illustrated in FIG. 3 when the lips are closed is referred to as a basic position. FIG. 4 is a diagram for explaining exemplary motion of the lip part. In the present embodiment, for example, the lip motion recognition unit 108 detects motion of the lip part 200 by detecting motion of Sites P1 to P8 of the lip part 200. The sites of the lip part 200 are not limited to these sites but may be any site from which motion of the lip part 200 can be read. Site P1 is a mouth corner the right side. Vector V1 represents motion of Site P1. Vector V1 represents motion of Site P1 relative to the basic position. In an example described in the present embodiment, Vector V1 is not illustrated because motion of Site P1 is small. In each diagram, Site P1 indicates the basic position. This is the same for the other sites. Site P2 is a mouth corner on the left side. Vector V2 represents motion of Site P2. In the example described in the present embodiment, Vector V2 is not illustrated because motion of Site P2 is small. Site P3 is an upper end part of the upper lip on the right side. Vector V3 represents motion of Site P3. Site P4 is an upper end part of the upper lip on the left side. Vector V4 represents motion of Site P4. Site P5 is a lower end part of the upper lip at a central part. Vector V5 represents motion of Site P5. Site P6 is a lower end part of the lower lip on the right side. Vector V6 represents motion of Site P6. Site P7 is a lower end part of the lower lip on the left side. Vector V7 represents motion of Site P7. Site P8 is an upper end part of the lower lip at a central part. Vector V8 represents motion of Site P8.

Each vector V may represent motion relative to the corresponding site P of the lip part 200 in moving image data of a frame one or a predetermined number of frames before.

Each vector V may represent motion of the corresponding site P of the lip part 200 when the next phoneme is uttered from a phoneme.

The comparison unit 109 compares a result of recognition by the voice recognition unit 106 with a result of recognition by the lip motion recognition unit 108 in an identical utterance, in other words, an identical duration. The identical duration corresponds to an arbitrary utterance unit such as each word or each phrase. The comparison of the recognition results is comparison in the recognition rate.

The recognition rate is calculated by comparing the content of utterance with a recognition result. The recognition rate is 100%, for example, when the content of utterance and the recognition result completely match each other. The recognition rate is calculated to be low when characters of the recognition result are wrongly inserted, deleted, or replaced for the content of utterance.

Figure 5:
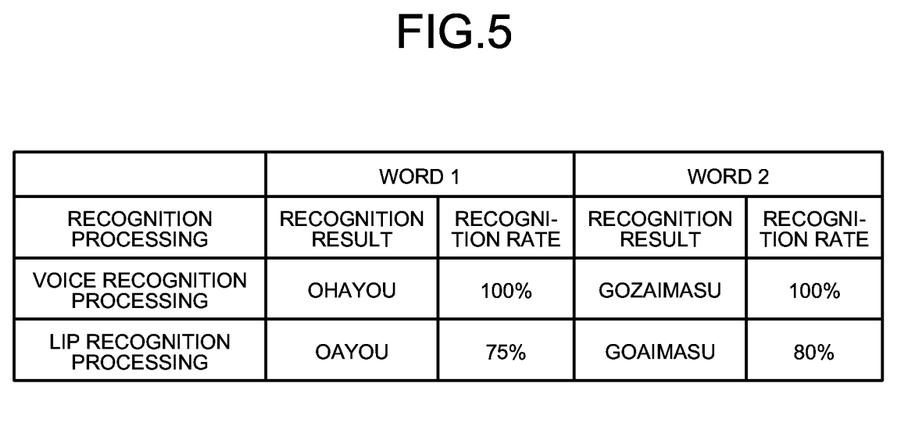
FIG. 5 is a diagram for explaining a processing result of voice recognition processing, a processing result of lip motion recognition processing, and the recognition rates thereof.

The following describes the recognition rate with reference to FIG. 5. FIG. 5 is a diagram for explaining a processing result of the voice recognition processing, a processing result of the lip motion recognition processing, and the recognition rate. The following describes an example in which the utterance of "ohayou" "gozaimasu" is recognized as "ohayou" "gosaimasu" by the voice recognition unit 106. The words of "ohayou" "gozaimasu" in the recognition result are determined to be words through weighting processing based on context or through comparison processing against a word dictionary, and thus the recognition rate of each word is 100%.

The following describes an example in which the utterance of "ohayou" "gozaimasu" is recognized as "oayou" "goaimasu" by the lip motion recognition unit 108. The words of "oayou" "goaimasu" in the recognition result are determined not to be words through weighting processing based on context or through comparison processing against a word dictionary. The utterance content is estimated to be "ohayou" "gozaimasu" based on the context and the word dictionary. Thus, the recognition rate of "oayou" is 75%, and the recognition rate of "goaimasu" is 80%.

The moving image processing unit 110 generates the enhancement moving image 210 enhanced to increase motion of the lip part 200 detected by the lip detection unit 107. In the present embodiment, the moving image processing unit 110 generates the enhancement moving image 210 when the recognition rate of the result of recognition by the lip motion recognition unit 108 is lower than that of the result of recognition by the voice recognition unit 106 as a result of the comparison by the comparison unit 109.

Figure 6:
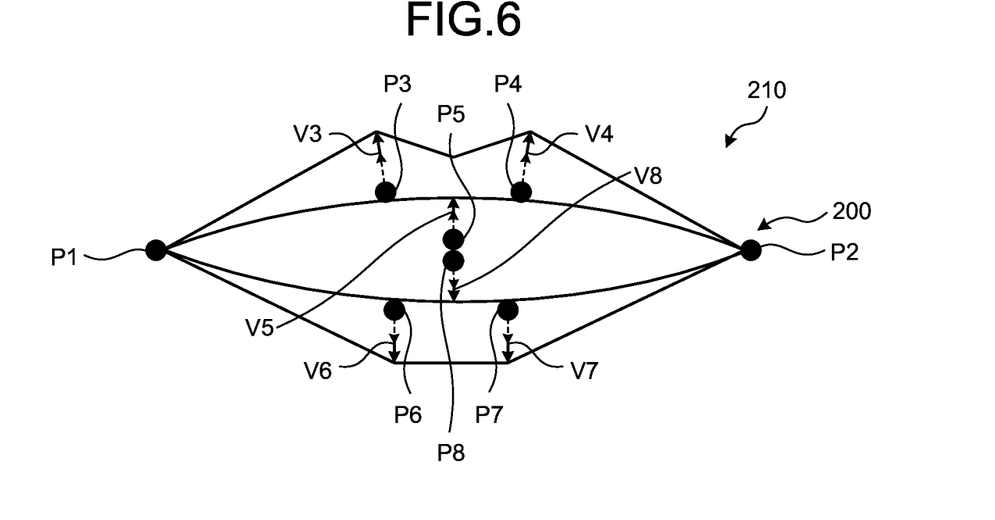
FIG. 6 is a diagram for explaining an exemplary enhancement moving image enhanced to increase motion of the lip part.
Figure 7:
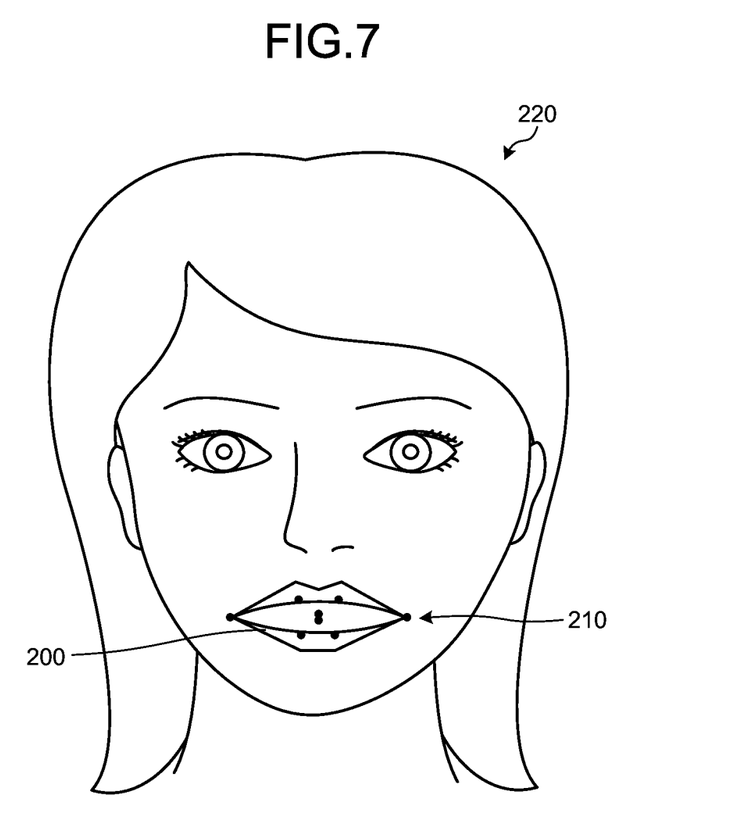
FIG. 7 is a diagram for explaining a moving image in which the enhancement moving image enhanced to increase motion of the lip part is superimposed or synthesized on a moving image of a face part of a user.

The following describes the enhancement moving image 210 with reference to FIGS. 4, 6, and 7. FIG. 6 is a diagram for explaining an exemplary enhancement moving image enhanced to increase motion of the lip part. FIG. 7 is a diagram for explaining a moving image in which the enhancement moving image enhanced to increase motion of the lip part is superimposed on or synthesized with a moving image of the face part of the user. First, Vectors V1 to V8 of Sites P1 to P8 of the lip part 200 illustrated in FIG. 4 are each multiplied by, for example, a coefficient of one or larger, more preferably, 1.5 to 2.0 inclusive to calculate the position of the corresponding site. In FIG. 6, dashed lines represent Vectors V1 to V8 illustrated in FIG. 4, and solid lines represent Vectors V1 to V8 each multiplied by the coefficient. Then, the calculated sites, in other words, leading end parts of the vectors are connected with each other to obtain an outer shape of the lip part 200. A moving image of the lip part 200 having the obtained outer shape in this manner is the enhancement moving image 210. In the present embodiment, in addition, the enhancement moving image 210 is superimposed on or synthesized with the lip part 200 in the original moving image of the face part of the user to generate a face part moving image 220 illustrated in FIG. 7.

Alternatively, an animation moving image of the face part of the user including the enhancement moving image 210 may be generated as the face part moving image 220. For example, the entire moving image including the face of the user may be expressed in animation, or only the lip part may be displayed as an animation moving image in synthesis with a moving image of the user acquired by the moving image acquisition unit.

The moving image processing unit 110 may generate the enhancement moving image 210 by correcting motion of the lip part 200 detected by the lip detection unit 107 based on voice recognized by the voice recognition unit 106.

Having started the processing of generating the enhancement moving image 210, the moving image processing unit 110 continues the generation processing, for example, until the end of a call.

As illustrated in FIG. 1, the storage unit 120 is used, for example, for temporary storage of data in the communication device 1. The storage unit 120 is, for example, a semiconductor memory element such as a random access memory (RAM), a read only memory (ROM), or a flash memory, or a storage device such as a hard disk or an optical disk. Alternatively, the storage unit 120 may be an external storage device wirelessly connected through a communication device (not illustrated). The storage unit 120 stores the lip dictionary data.

Figure 8:
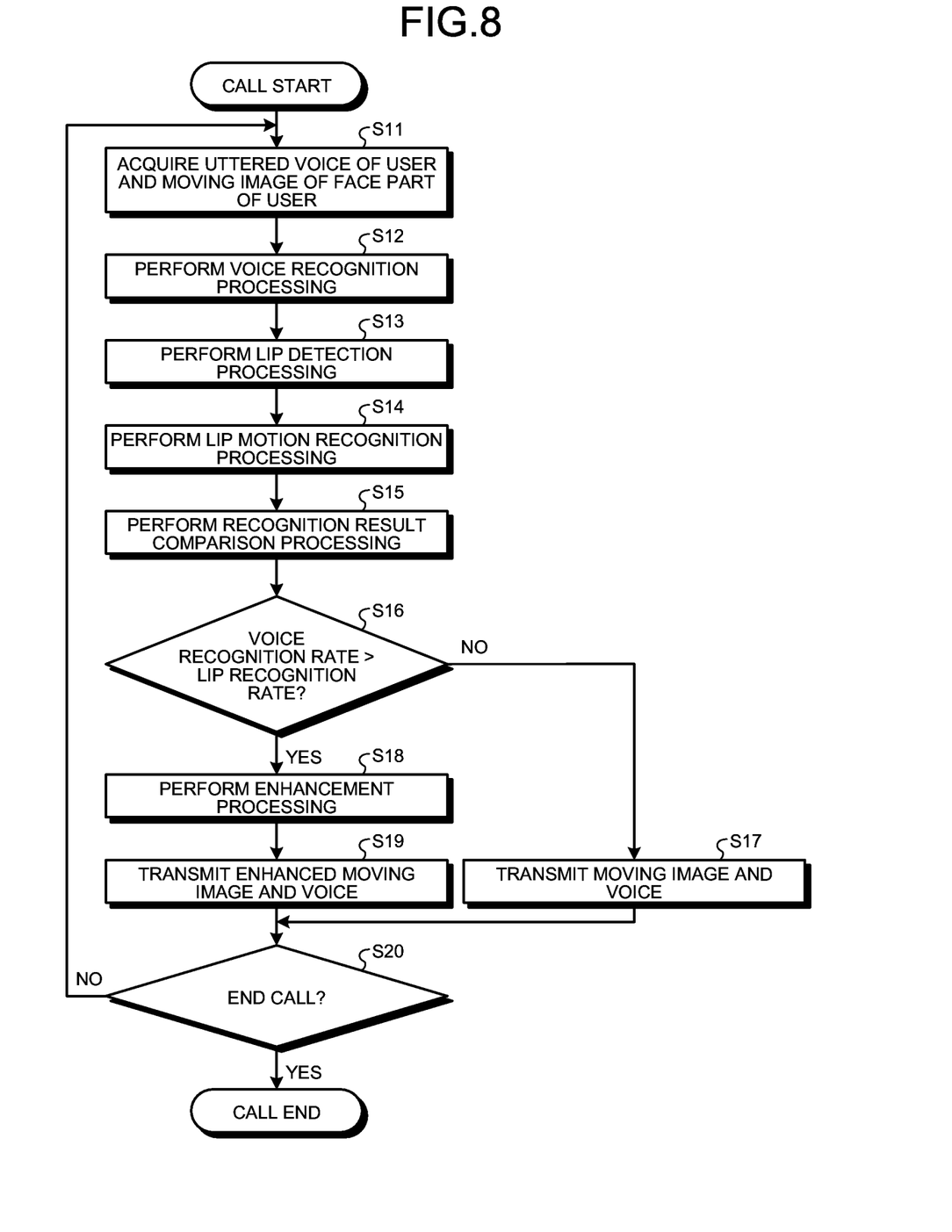
FIG. 8 is a flowchart illustrating the process of processing at the communication device according to the first embodiment.

The following describes the process of processing at the control unit 100 of the communication device 1 with reference to FIG. 8. FIG. 8 is a flowchart illustrating the process of processing at the communication device according to the first embodiment. When an operation that starts a call is executed at the communication device 1, processing at step S11 and later is executed. In the communication device 1, uttered voice of the calling counterpart is acquired by the transmission-reception unit 30 during the call, in other words, while the processing of the flowchart illustrated in FIG. 8 is executed.

The control unit 100 acquires uttered voice of the user and a moving image of the face part of the user (step S11). More specifically, the control unit 100 acquires voice data of the uttered voice of the user through the voice acquisition unit 102. The control unit 100 acquires moving image data of the face part of the user through the moving image acquisition unit 101. The control unit 100 proceeds to step S12.

The control unit 100 executes the voice recognition processing (step S12). More specifically, the control unit 100 executes, through the voice recognition unit 106, the voice recognition processing of recognizing voice from the voice data acquired by the voice acquisition unit 102. The control unit 100 proceeds to step S13.

The control unit 100 executes the lip detection processing (step S13). More specifically, through the lip detection unit 107, the control unit 100 detects the lip part 200 from the moving image data acquired by the moving image acquisition unit 101 and detects motion of the lip part 200. The control unit 100 proceeds to step S14.

The control unit 100 executes the lip motion recognition processing (step S14). More specifically, the control unit 100 recognizes, through the lip motion recognition unit 108, the content of utterance from the motion of the lip part 200 detected by the lip detection unit 107. The control unit 100 proceeds to step S15.

The control unit 100 executes the recognition result comparison processing (step S15). More specifically, the control unit 100 compares, through the comparison unit 109, the recognition rate of the result of recognition by the voice recognition unit 106 with the recognition rate of the result of recognition by the lip motion recognition unit 108 with each other. The control unit 100 proceeds to step S16.

The control unit 100 determines whether the voice recognition rate is higher than the lip recognition rate (step S16). More specifically, when the recognition rate of the result of recognition by the voice recognition unit 106 is higher than the recognition rate of the result of recognition by the lip motion recognition unit 108 (Yes at step S16), the control unit 100 proceeds to step S18. When the recognition rate of the result of recognition by the voice recognition unit 106 is not higher than the recognition rate of the result of recognition by the lip motion recognition unit 108 (No at step S16), the control unit 100 proceeds to step S17.

The control unit 100 transmits the moving image and the voice (step S17). More specifically, the control unit 100 outputs the voice data of the user and the moving image data of the face part of the user to the transmission-reception unit 30 through the call processing unit 103. Accordingly, the control unit 100 transmits the moving image data of the face part of the user, on which processing of enhancing motion of the lip part 200 is not performed, together with the voice data of the user to the calling counterpart. The control unit 100 proceeds to step S20.

The control unit 100 executes the enhancement processing (step S18). More specifically, the control unit 100 generates the enhancement moving image 210 through the moving image processing unit 110. Accordingly, the face part moving image 220 of the face part of the user including the enhancement moving image 210 in which motion of the lip part 200 of the user is enhanced is generated. The control unit 100 proceeds to step S19.

The control unit 100 transmits the enhanced moving image and voice (step S19). More specifically, the control unit 100 outputs the voice data of the user and the moving image data of the face part moving image 220 of the face part of the user including the enhancement moving image 210 to the transmission-reception unit 30 through the call processing unit 103. Accordingly, the control unit 100 transmits the moving image data of the face part moving image 220 including the enhancement moving image 210 of the user to the calling counterpart together with the voice data of the user. The control unit 100 proceeds to step S20.

The control unit 100 determines whether an operation that ends the call is executed (step S20). More specifically, when the call ending operation such as selection of a button for ending the call is executed (Yes at step S20), the control unit 100 ends the call and ends the processing of the flowchart. When the call ending operation is not executed (No at step S20), the control unit 100 executes the processing at step S11 again.

In this manner, the enhancement moving image 210 enhanced to increase motion of the lip part 200 of the user is generated when the recognition rate of the result of recognition by the lip motion recognition unit 108 is lower than that of the result of recognition by the voice recognition unit 106.

As described above, in the present embodiment, when the recognition rate of the result of recognition by the lip motion recognition unit 108 is lower than that of the result of recognition by the voice recognition unit 106, the face part moving image 220 including the enhancement moving image 210 in which motion of the lip part 200 of the user is enhanced is transmitted to the calling counterpart together with voice. According to the present embodiment, it is possible to facilitate recognition of the content of utterance by the user from the enhancement moving image 210 by the calling counterpart when motion of the lip part 200 of the user is small. In this manner, the present embodiment allows the calling counterpart to appropriately recognize the content of utterance by the user. According to the present embodiment, it is possible to allow the calling counterpart who has hearing impairment to easily have a call.

In the present embodiment, the enhancement moving image 210 is superimposed on or synthesized with the moving image of the face part of the user. Accordingly, according to the present embodiment, the calling counterpart can easily recognize uttered voice of the user from the enhancement moving image 210, and can read expression from the face part moving image 220 of the face part of the user and appropriately understand the intention of the content of utterance by the user.

Second Embodiment

Figure 9:
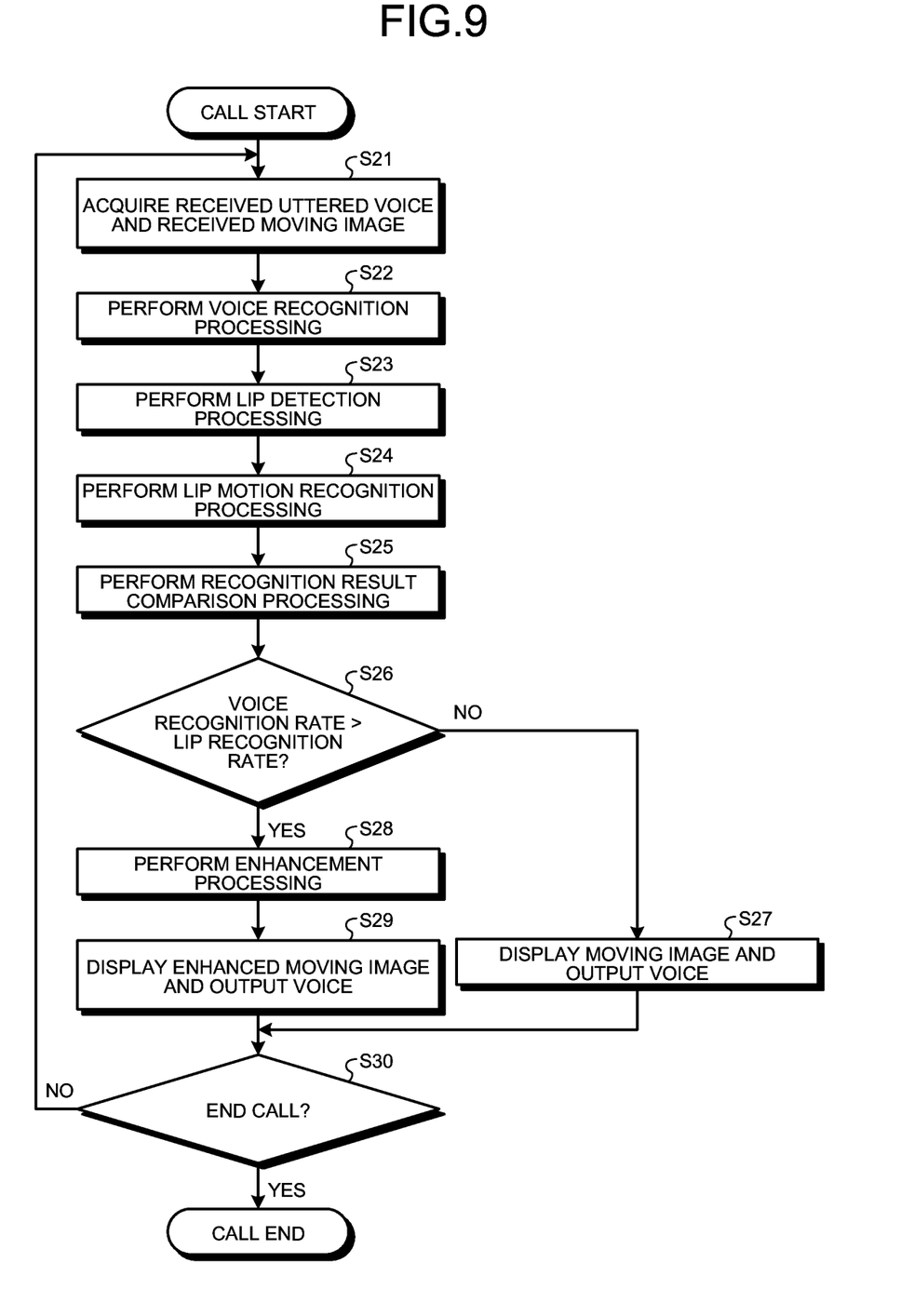
FIG. 9 is a flowchart illustrating the process of processing at the communication device according to a second embodiment.

The following describes the communication device 1 according to the present embodiment with reference to FIG. 9. FIG. 9 is a flowchart illustrating the process of processing at the communication device according to the second embodiment. In the present embodiment, the user of the communication device 1 is a hearing-impaired person. In the present embodiment, the utterer is the calling counterpart. In the present embodiment, the communication device 1 displays a moving image of the face part of the calling counterpart corresponding to uttered voice of the calling counterpart to allow the user as the hearing-impaired person to easily have a call. The communication device 1 has a basic configuration same as that of the communication device 1 in the first embodiment. In the following description, any component same as that in the communication device 1 is denoted by an identical reference sign or a corresponding reference sign, and a detailed description thereof is omitted. The communication device 1 is different from the communication device 1 in processing at the control unit 100.

While a call is performed through the transmission-reception unit 30, the display panel 40 displays the face part moving image 220 of the face part of the calling counterpart including the enhancement moving image 210 corresponding to uttered voice of the calling counterpart.

The speaker 50 outputs uttered voice of the calling counterpart while a call is performed through the transmission-reception unit 30.

When the recognition rate of the lip part 200 of the calling counterpart is low, the control unit 100 generates the enhancement moving image 210 in which motion of the lip part 200 of the calling counterpart is enhanced.

The moving image acquisition unit 101 acquires, through the call processing unit 103, moving image data obtained by capturing a moving image of a mouth part including at least the lip part 200 of the calling counterpart.

The voice acquisition unit 102 acquires at least the voice data of the calling counterpart through the call processing unit 103.

The call processing unit 103 acquires the voice data and the moving image data from the transmission-reception unit 30. The call processing unit 103 outputs the acquired voice data to the voice acquisition unit 102. The call processing unit 103 outputs the acquired moving image data to the moving image acquisition unit 101.

The display control unit 104 outputs an image signal for displaying a moving image of the face part of the calling counterpart to the display panel 40 at calling. More specifically, the display control unit 104 executes decoding processing on the moving image data of the face part of the calling counterpart acquired from the call processing unit 103, and outputs the image signal to the display panel 40. Alternatively, the display control unit 104 executes decoding processing on the moving image data of the moving image of the face part of the calling counterpart including the enhancement moving image 210 generated by the moving image processing unit 110, and outputs the image signal to the display panel 40.

The following describes the process of processing at the communication device 1 with reference to FIG. 9. Processing at steps S22 to S26 and S30 in the flowchart illustrated in FIG. 9 is same as the processing at steps S12 to S16 and S20 in the flowchart illustrated in FIG. 8.

The control unit 100 acquires received uttered voice of the calling counterpart and a received moving image of the face part of the calling counterpart (step S21). More specifically, the control unit 100 acquires voice data of the uttered voice of the calling counterpart and moving image data of the face part of the calling counterpart through the call processing unit 103. The control unit 100 proceeds to step S22.

The control unit 100 displays the moving image and outputs the voice (step S27). More specifically, the control unit 100 executes, through the display control unit 104, decoding processing on the moving image data on which processing of enhancing motion of the lip part 200 of the calling counterpart is not performed, and outputs an image signal for displaying the moving image to the display panel 40. The control unit 100 executes D/A conversion processing on the voice data of the calling counterpart through the voice output processing unit 105, and outputs a voice signal to the speaker 50. The control unit 100 proceeds to step S30.

The control unit 100 executes the enhancement processing (step S28). Accordingly, moving image data of a face part moving image including the enhancement moving image 210 of the calling counterpart is generated. The control unit 100 proceeds to step S29.

The control unit 100 displays the enhanced moving image and outputs the voice (step S29). More specifically, the control unit 100 executes, through the display control unit 104, decoding processing on the moving image data of the face part moving image including the enhancement moving image 210 of the calling counterpart, and outputs an image signal to the display panel 40. The control unit 100 executes D/A conversion processing on the voice data of the calling counterpart through the voice output processing unit 105, and outputs a voice signal to the speaker 50. The control unit 100 proceeds to step S30.

In this manner, the enhancement moving image 210 enhanced to increase motion of the lip part 200 of the calling counterpart is generated when the recognition rate of the result of recognition by the lip motion recognition unit 108 is lower than that of the result of recognition by the voice recognition unit 106.

As described above, in the present embodiment, when the recognition rate of the result of recognition by the lip motion recognition unit 108 is lower than that of the result of recognition by the voice recognition unit 106, the face part moving image 220 including the enhancement moving image 210 in which motion of the lip part 200 of the calling counterpart is enhanced is displayed and voice of the calling counterpart is output. According to the present embodiment, it is possible to facilitate recognition of the content of utterance by the calling counterpart from the enhancement moving image 210 by the user even when motion of the lip part 200 of the calling counterpart is small. In this manner, the present embodiment allows the user to appropriately recognize the content of utterance by the calling counterpart. According to the present embodiment, it is possible to allow the calling counterpart to easily have a call with the user who has hearing impairment.

Third Embodiment

Figure 10:
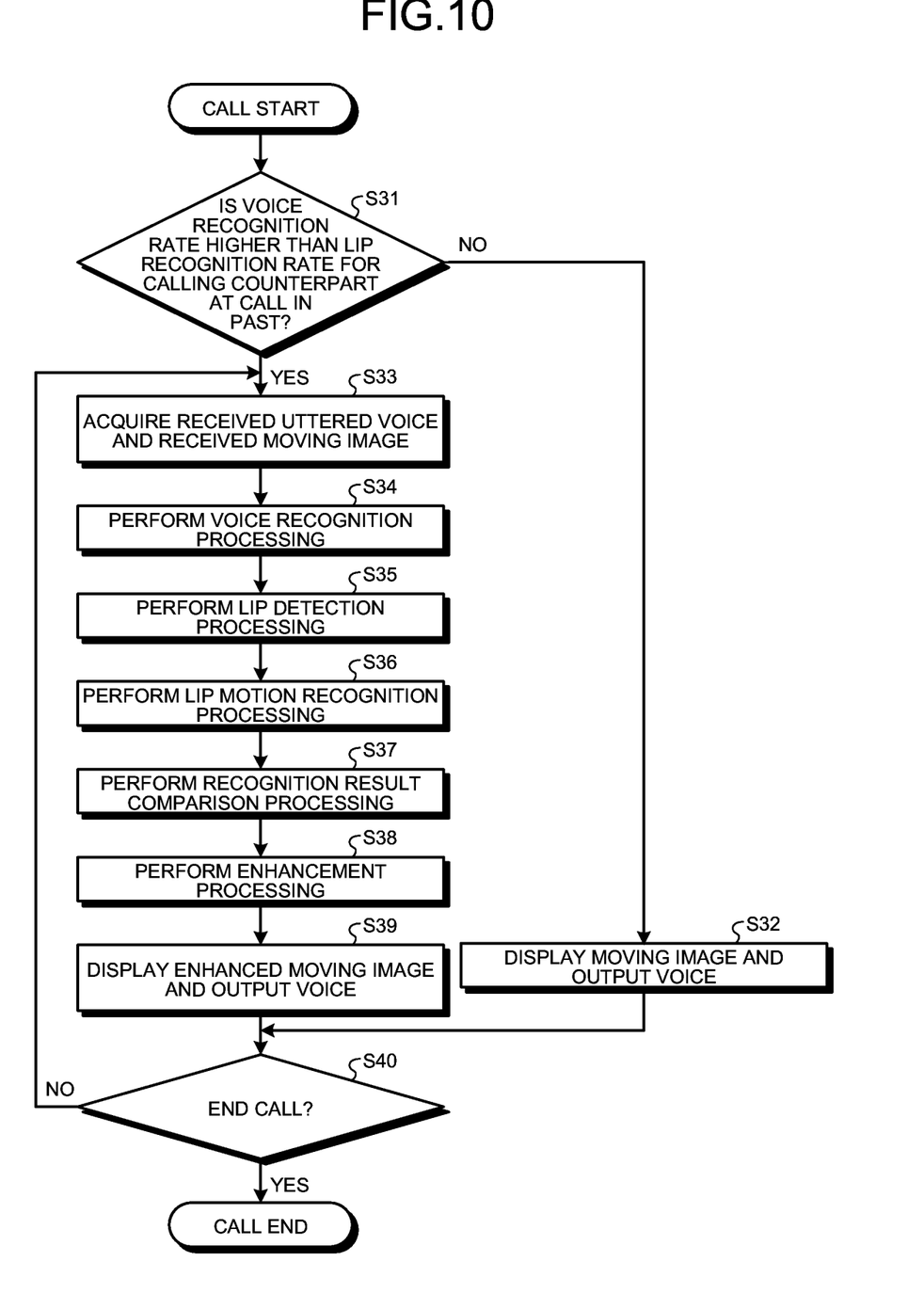
FIG. 10 is a flowchart illustrating the process of processing at the communication device according to a third embodiment.

The following describes the communication device 1 according to the present embodiment with reference to FIG. 10. FIG. 10 is a flowchart illustrating the process of processing at the communication device according to the third embodiment. In the present embodiment, the user of the communication device 1 is a hearing-impaired person. In the present embodiment, the utterer is the calling counterpart. The communication device 1 has a basic configuration same as that of the communication device 1 in the second embodiment. The communication device 1 is different from the communication device 1 in the second embodiment in processing at the control unit 100.

When it is determined for the communication counterpart based on a call in the past that the recognition rate of the result of recognition by the lip motion recognition unit 108 is lower than that of the result of recognition by the voice recognition unit 106, the control unit 100 generates, from the start of a call, the enhancement moving image 210 in which motion of the lip part 200 is enhanced.

The comparison unit 109 stores a result of the comparison in the storage unit 120 for each calling counterpart and each call.

When it is determined for the communication counterpart based on a call in the past that the recognition rate of the result of recognition by the lip motion recognition unit 108 is lower than that of the result of recognition by the voice recognition unit 106, the moving image processing unit 110 generates the enhancement moving image 210.

The storage unit 120 stores a result of the comparison by the comparison unit 109 for each calling counterpart and each call.

The following describes the process of processing at the communication device 1 with reference to FIG. 10. Processing at steps S32, S33 to S37, and S38 to S40 in the flowchart illustrated in FIG. 10 is same as the processing at steps S27, S21 to S25, and S28 to S30 in the flowchart illustrated in FIG. 9.

The control unit 100 determines whether it is determined for the calling counterpart based on a call in the past that the voice recognition rate is higher than the lip recognition rate (step S31). More specifically, when the storage unit 120 stores a result of the comparison by the comparison unit 109 for a call in the past by the calling counterpart, the result indicating that the recognition rate of the result of recognition by the voice recognition unit 106 is higher than the recognition rate of the result of recognition by the lip motion recognition unit 108 (Yes at step S31), the control unit 100 proceeds to step S33. When no such a result is stored (No at step S31), the control unit 100 proceeds to step S32.

In this manner, the enhancement moving image 210 enhanced to increase motion of the lip part 200 of the calling counterpart is generated when it is determined for the communication counterpart based on a call in the past that the recognition rate of the result of recognition by the lip motion recognition unit 108 is lower than that of the result of recognition by the voice recognition unit 106.

As described above, in the present embodiment, when it is determined for the communication counterpart based on a call in the past that the recognition rate of the result of recognition by the lip motion recognition unit 108 is lower than that of the result of recognition by the voice recognition unit 106, the face part moving image 220 including the enhancement moving image 210 in which motion of the lip part 200 of the calling counterpart is enhanced is displayed and the voice of the calling counterpart is output. According to the present embodiment, it is possible to allow the user who has hearing impairment to easily have a call with the calling counterpart.

The communication device 1 according to the present disclosure is described above but may be achieved in various kinds of different forms other than the above-described embodiments.

The illustrated components of the communication device 1 are functionally conceptual and do not necessarily need to be physically configured as illustrated. In other words, a specific form of each device is not limited to that illustrated, but the entire or part thereof may be functionally or physically distributed or integrated in arbitrary units in accordance with a processing load on the device, a use status thereof, and the like.

The configuration of the communication device 1 is achieved as, for example, software by a computer program loaded onto the memory. In the above-described embodiments, each functional block is achieved through hardware or software cooperation. In other words, each functional block may be achieved in various kinds of forms with hardware only, software only, or combination thereof.

The above-described components include components that could be easily thought of by the skilled person in the art, and components that are identical in effect. The above-described configurations may be combined with each other as appropriate. Various kinds of omission, replacement, or change of the configurations are possible without departing from the scope of the present disclosure.

The first embodiment and the second embodiment may be achieved as one communication device.

The above description is made on a communication device, but the present disclosure is not limited to the communication device. The present disclosure is also applicable to a display control device including the moving image acquisition unit 101, the voice acquisition unit 102, the display control unit 104, the voice output processing unit 105, the voice recognition unit 106, the lip detection unit 107, the lip motion recognition unit 108, the comparison unit 109, and the moving image processing unit 110. For example, when the user as a hearing-impaired person watches a news moving image in which a broadcaster reads out news, the enhancement moving image 210 in which motion of the lip part 200 of the broadcaster is enhanced can be watched on the display control device. For example, when the user generates a moving image for a hearing-impaired person, the display control device can generate a moving image including the enhancement moving image 210 in which motion of the lip part 200 of the utterer is enhanced.

At step S16 in the flowchart illustrated in FIG. 8, the control unit 100 may determine whether the lip recognition rate is equal to or smaller than a threshold. Then, the control unit 100 proceeds to step S18 when it is determined that the lip recognition rate is equal to or smaller than the threshold, or proceeds to step S17 when it is determined that the lip recognition rate is not equal to nor smaller than the threshold.

The present disclosure is intended to solve the above-described problem and allow appropriate recognition of the content of utterance.

What is claimed is:

1. A display control device comprising:
a processor; and
a memory that stores executable instructions that, when executed by the processor, facilitate performance of operations, comprising:
acquiring moving image data obtained through moving image capturing of at least a mouth part of an utterer;
detecting a lip part from the moving image data and detect motion of the lip part;
recognizing an utterance content from the motion of the lip part;
acquiring voice data of an uttered voice of the utterer;
recognizing a voice from the voice data;
determining a first recognition rate associated with the utterance content and a first recognition result that is estimated based on the context of the voice data when recognizing the voice from the motion of the lip part;
determining a second recognition rate associated with the utterance content and a second recognition result that is estimated based on the context of the utterance content when recognizing the utterance content by a voice recognition in an utterance of an identical duration to that of the motion of the lip part;
comparing the first recognition rate with the second recognition rate;
when the first recognition rate of recognizing the utterance content from the motion of the lip part is lower than the second recognition rate of recognizing the voice by the voice recognition as a result of comparing the first recognition rate with the second recognition rate in the utterance of the identical duration to that of the motion of the lip part, generating a moving image enhanced to increase the motion of the lip part; and
controlling a display unit to display the moving image.

2. The display control device according to claim 1, wherein the operations further comprise:
generating an animation moving image enhanced to increase the lip motion.

3. A communication device comprising:
the display control device according to claim 1, wherein the operations further comprise:
performing call processing;
acquiring the uttered voice during a call; and
enhancing a moving image to increase the motion of the lip part.

4. The communication device according to claim 3, wherein,
when the first recognition rate of recognizing the utterance content from the motion of the lip part is lower than the second recognition rate of recognizing the voice by the voice recognition as a result of comparing the first recognition rate with the second recognition rate in the utterance of the identical duration to that of the motion of the lip part, after the start of the call, performing enhancement processing for having a moving image in which the lip motion is increased until the end of the call.

5. The communication device according to claim 3, wherein,
when a calling counterpart is a calling counterpart for which the first recognition rate of recognizing the utterance content from the motion of the lip part is lower than the second recognition rate of recognizing the voice by the voice recognition as a result of comparing the first recognition rate with the second recognition rate in the utterance of the identical duration to that of the motion of the lip part in a call in the past, performing enhancement processing for having a moving image in which the lip motion is increased from the start of the call.

6. A communication device comprising:
the display control device according to claim 1, wherein the operations further comprise:
performing call processing;
recognizing voice from voice data; and
acquiring moving image data.

7. The communication device according to claim 6, wherein,
when the first recognition rate of recognizing the utterance content from the motion of the lip part is lower than the second recognition rate of recognizing the voice by the voice recognition as a result of comparing the first recognition rate with the second recognition rate in the utterance of the identical duration to that of the motion of the lip part, after the start of the call, performing enhancement processing for having a moving image in which the lip motion is increased until the end of the call.

8. The communication device according to claim 6, wherein, when a calling counterpart is a calling counterpart for which the first recognition rate of recognizing the utterance content from the motion of the lip part is lower than the second recognition rate of recognizing the voice by the voice recognition as a result of comparing the first recognition rate with the second recognition rate in the utterance of the identical duration to that of the motion of the lip part in a call in the past, performing enhancement processing for having a moving image in which the lip motion is increased from the start of the call.

9. A display control method comprising:
   a moving image acquisition step of acquiring moving image data obtained through moving image capturing of at least a mouth part of an utterer;
   a lip detection step of detecting a lip part from the moving image data and detecting motion of the lip part;
   a lip motion recognition step of recognizing an utterance content from the motion of the lip part detected by the lip detection step;
   a voice acquisition step of acquiring voice data of an uttered voice of the utterer;
   a voice recognition step of recognizing a voice from the voice data acquired by the voice acquisition step;
   a first determining step of determining a first recognition rate associated with the utterance content and a first recognition result that is estimated based on the context of the voice data from the recognition by the voice recognition step from the motion of the lip part;
   a second determining step of determining a second recognition rate associated with the utterance content and a second recognition result that is estimated based on the context of the utterance content from the recognition by the lip motion recognition step in an utterance of an identical duration to that of the motion of the lip part;
   a comparison step of comparing the first recognition rate with the second recognition rate;
   a moving image processing step of, when the first recognition rate of the recognition by the lip motion recognition step is lower than the second recognition rate of the recognition by the voice recognition step as a result of the comparison step comparing the first recognition rate with the second recognition rate in the utterance of the identical duration to that of the motion of the lip part, generating a moving image enhanced to increase the motion of the lip part detected by the lip detection step; and
   a display control step of controlling a display unit to display the moving image generated by the moving image processing step.

10. A non-transitory computer readable recording medium storing therein a computer program configured to cause a computer to execute:
    a moving image acquisition step of acquiring moving image data obtained through moving image capturing of at least a mouth part of an utterer;
    a lip detection step of detecting a lip part from the moving image data and detecting motion of the lip part;
    a lip motion recognition step of recognizing an utterance content from the motion of the lip part detected by the lip detection step;
    a voice acquisition step of acquiring voice data of an uttered voice of the utterer;
    a voice recognition step of recognizing a voice from the voice data acquired by the voice acquisition step;
    a first determining step of determining a first recognition rate associated with the utterance content and a first recognition result that is estimated based on the context of the voice data from the recognition by the voice recognition step from the motion of the lip part;
    a second determining step of determining a second recognition rate associated with the utterance content and a second recognition result that is estimated based on the context of the utterance content from the recognition by the lip motion recognition step in an utterance of an identical duration to that of the motion of the lip part;
    a comparison step of comparing the first recognition rate with the second recognition rate;
    a moving image processing step of, when the first recognition rate of the recognition by the lip motion recognition step is lower than the second recognition rate of the recognition by the voice recognition step as a result of the comparison step comparing the first recognition rate with the second recognition rate in the utterance of the identical duration to that of the motion of the lip part, generating a moving image enhanced to increase the motion of the lip part detected by the lip detection step; and
    a display control step of controlling a display unit to display the moving image generated by the moving image processing step.

\* \* \* \* \*